United States Patent [19]

Summers et al.

[11] 4,410,788

[45] Oct. 18, 1983

[54] POWER AND FLUID SUPPLY SOURCE WITH MULTI-FUNCTION CUTTING AND WELDING CAPABILITIES

[76] Inventors: John E. Summers; Randolph F. Howell, both of P.O. Box 5433, Charlotte, N.C. 28225

[21] Appl. No.: 269,733

[22] Filed: Jun. 2, 1981

Related U.S. Application Data

[63] Continuation-in-part of Ser. No. 140,761, Apr. 16, 1980, abandoned.

[51] Int. Cl.³ .............................................. B23K 9/10
[52] U.S. Cl. ................................ 219/130.1; 219/75; 219/121 PU; 219/130.32
[58] Field of Search ................... 219/130.1, 130.32, 75, 219/121 PT, 121 PU

[56] References Cited

U.S. PATENT DOCUMENTS

| | | | |
|---|---|---|---|
| 3,132,235 | 5/1964 | Anderson | 219/75 |
| 3,199,016 | 8/1965 | Greene et al. | 219/130.32 |
| 3,530,359 | 9/1970 | Grist | 219/130.32 |
| 3,652,824 | 3/1972 | Okada | 219/130.1 |
| 3,746,965 | 7/1973 | Okada et al. | 219/130.32 |
| 3,774,007 | 11/1973 | Chiasson et al. | 219/130.32 |
| 3,984,654 | 10/1976 | Hoffman et al. | 219/130.32 |
| 3,988,566 | 10/1976 | Vogts et al. | 219/121 PT |
| 4,109,130 | 8/1978 | Oku | 219/130.32 |
| 4,280,041 | 7/1981 | Kiessling et al. | 219/121 PT |

*Primary Examiner*—C. C. Shaw
*Attorney, Agent, or Firm*—Oblon, Fisher, Spivak, McClelland & Maier

[57] ABSTRACT

A method and apparatus is disclosed for providing an improved power and fluid supply system which operates in a multiple functioning welding and cutting apparatus and which consists of a combination of a main power transformer which supplies the main welding current and a very high voltage transformer for supplying very high voltages above 200 volts required for plasma cutting. A transformer switching device provides for coupling between the main transformer and the very high voltage transformer in order to selectively connect the main transformer and the very high voltage transformer in parallel. The power supply including the main transformer, the very high voltage transformer and the transformer switching device are connected to a tool coupling device in order to selectively apply appropriate voltage and current levels to the tool coupling device through the use of a selector switch which is coupled to the fluid supply end of the power supply for selectively changing their respective outputs.

6 Claims, 7 Drawing Figures

POWER AND FLUID SUPPLY SOURCE WITH MULTI-FUNCTION CUTTING AND WELDING CAPABILITIES

RELATIONSHIP TO CO-PENDING APPLICATION

This application is a Continuation-In-Part of application Ser. No. 140,761, filed Apr. 16, 1980, now abandoned.

BACKGROUND OF THE INVENTION

1. Field of the Invention

The present invention relates generally to welding equipment and more particularly to an apparatus and system for providing a multi-function welding and cutting fluid and power supply.

2. Description of the Prior Art

The complexion of the metal fabracating industry has changed substantially in the past few years. In prior times it was relatively rare for smaller metal fabricating shops to become involved in work with more exotic materials such as stainless steel, titainum, copper and other alloys which could not be handled using conventional cutting and welding equipment. For these reasons, even smaller scale fabricating shops are now required to main two separate power sources to provide the capability of carrying on Stick Electrode Welding, Tungsten Inert Gas (TIG) Welding, Plasma Welding and Plasma Cutting. However conventional equipment used for Plasma Cutting is presently extremely expensive and constitutes a relatively high level of investment, particularly for small fabrication shops. Furthermore, since shops of this nature do not continuously work with more exotic materials of the type described above, the expensive conventional plasma cutting and welding equipment is typically not used a good portion of the time, and accordingly investment in such equipment becomes an inefficient use of resources. Thus a need exists for a relatively low cost multi-function unit capable of all modes of welding and cutting, including Plasma Cutting through ordinary Stick Welding.

In order to achieve a system which is capable of performing the many different types of welding and cutting processes described above, it is necessary to provide high voltage capabilities along with many other control facilities for supplying various fluids including gases and cooling water. In the past welding power supplies have been developed which appear similar to the multi-level power system of the present invention, yet are totally incapable of supplying power for both plasma and conventional welding. An example of such a device is disclosed in the Grist patent (U.S. Pat. No. 3,530,359), issued Sept. 22, 1970. This patent discloses a conventional adjustable arc welding power supply system having two rectifier type power supplies connected in parallel. One power supply provides the main welding current, and the other provides a somewhat higher voltage for starting the arc. This arc starting voltage, although higher than conventional welding current supply voltages is a "high" voltage only by reference to the welding supply voltage (e.g. 80 volts versus approximately 40 volts for the welding supply). This somewhat higher voltage auxiliary power supply of the Grist reference is only sufficient for arc starting purposes in a conventional arc welding supply. However, the 80 volt auxiliary power supply is not in any way sufficient to provide the voltage levels required for a sophisticated process such as Plasma Cutting, as this process requires an open circuit voltage on the order of 250 volts. Accordingly, the invention disclosed in the Grist patent is not at all suitable for multi function purposes, but can be used only as a conventional arc welding power supply. Furthermore, the device disclosed in this reference does not have the capability of supplying selected welding gases and cooling liquid.

The present invention is therefore believed to constitute a substantial advance over such previously known welding systems.

SUMMARY OF THE INVENTION

Accordingly, one object of this invention it to provide a novel and substantially improved multi-function fluid and power supply system for use in welding and cutting.

Another object of the present invention is the provision of a novel welding and cutting power and fluid supply system capable of performing Plasma Cutting, Plasma Welding, TIG Welding and Stick Electrode Welding.

Yet another object of the present invention is the provision of a adjustable power supply coupled with a control network for supplying the necessary gas, cooling fluid and power supply level to various types of welding and cutting tools.

A still further object of the present invention is the provision of a novel method of providing a multi-function welding fluid and power supply system.

Briefly, these and other objects of the present invention are achieved by the provision of a novel power supply system including very high voltage power supply coupled in parallel with a three-phase welding power supply. A control network is provided to permit the very high voltage auxiliary system to be switched in and switched out of the welding circuit on a selective basis. Furthermore, a control network is provided for automatically delivering to a welding or cutting tool the necessary voltage level, gas and cooling fluid required for carrying out a particular type of welding or cutting operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figures 1, 7:
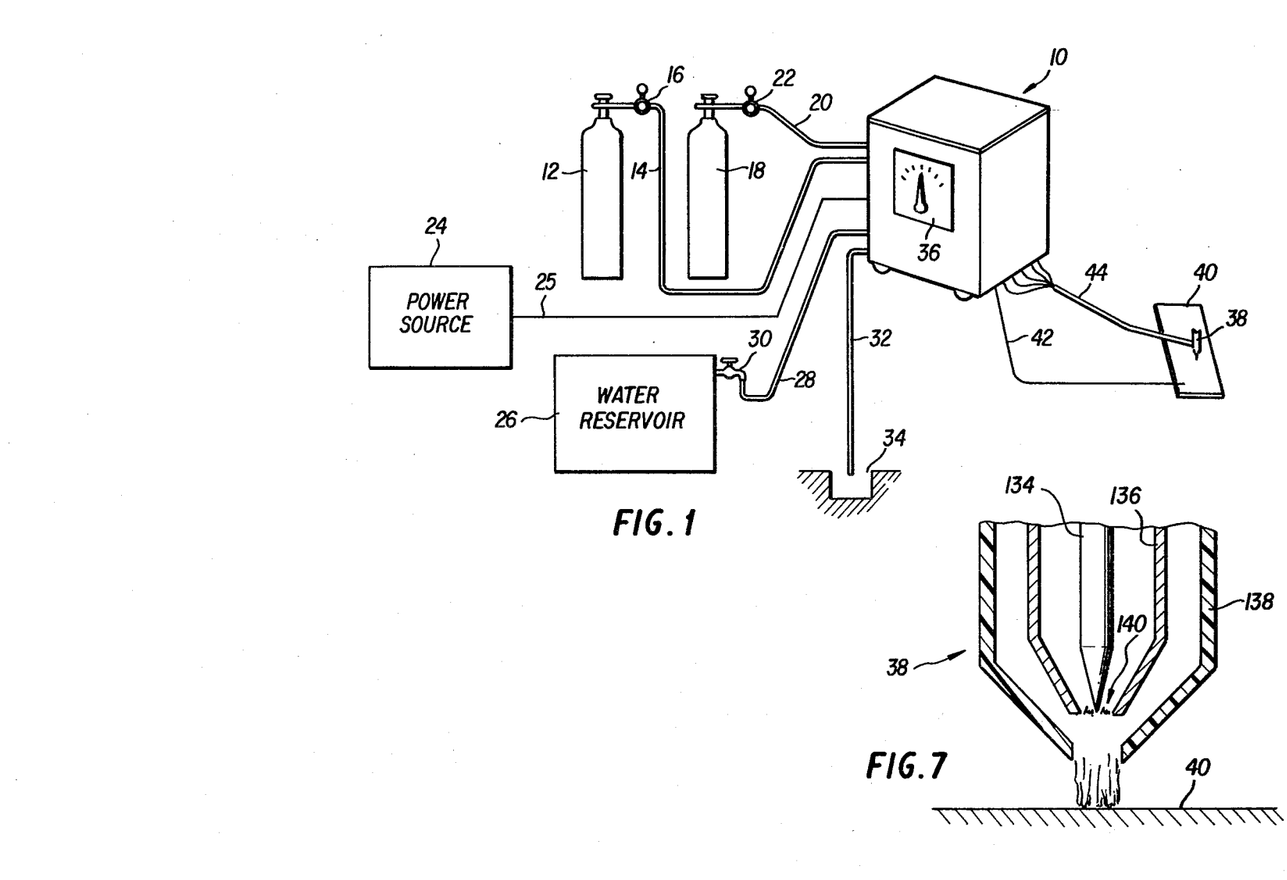
FIG. 1 is a partially schematic illustration of the multi function power and fluid supply system of the present invention.
FIG. 7 is a cut-away view of a plasma cutting torch.

Referring now to the drawings, wherein like reference numerals designate identical or corresponding parts throughout the several views, and more particularly to FIG. 1 thereof, the multi-function fluid and power supply system of the present invention is illustrated in schematic form.

The system of the invention includes a main housing 10 containing the power supply and the various power and fluid switching components of the invention. A first gas cylinder 12 is coupled to the housing 10 by a conventional gas line 14 having a manual control valve 16 therein. A second gas cylinder 18 is similarly coupled to the housing 10 through a conventional gas line 20 having a manual control valve 22 therein. The gas cylinder 12 may contain argon for example, while the gas cylinder 18 may typically contain a combination of argon and hydrogen carbon dioxide, air, helium, etc. Similarly, other types of appropriate gases can be coupled to the system in accordance with the needs and requirements of the welding or cutting operations desired to be carried on. A power source 24 is similarly coupled to the main housing 10. The power source 24 maybe a conventional three-phase power line from a standard utility, an appropriate motor driven three-phase generator, or any other equivelent three-phase power supply capable of delivering appropriate current to a welding supply system. A cooling water reservoir 26 is also coupled to the housing 10 by means of a conventional water line 28 having a manually operated control valve 30 therein. The water reservoir maybe either a portable water supply with an appropriate pressure head, or may simply be a city water supply. A water return line 32 is coupled to the housing 10 and returns the heated cooling water to a suitable drain 34. A function selector switch 36 is mounted on the housing 10 to permit manual selection of any one of a plurality of functions by the operator of the system. The valving and power supply networks to be described subsequently are switched in unison by appropriate manual operation of the selector switch 36. These networks apply the appropriate voltages and fluids to the work head 38 shown engaging a workpiece 40 in FIG. 1. The workpiece 40 is a conductive metal piece and is coupled to a reference potential, such as ground, within the main housing 10 by means of a reference potential line 42. The work head 38 is coupled to the main housing 10 and to the internal fluid and power switching system therein by means of a multi-function line 44 which is capable of supplying appropriate fluids and appropriate power levels to the work head 38. It will of course be understood by those skilled in the art that the work head 38 maybe any conventional head selected in accordance with the desired welding or cutting function, and that the line 44 may be a conventional fluid and/or power line for use with the selected work head.

Figure 2:
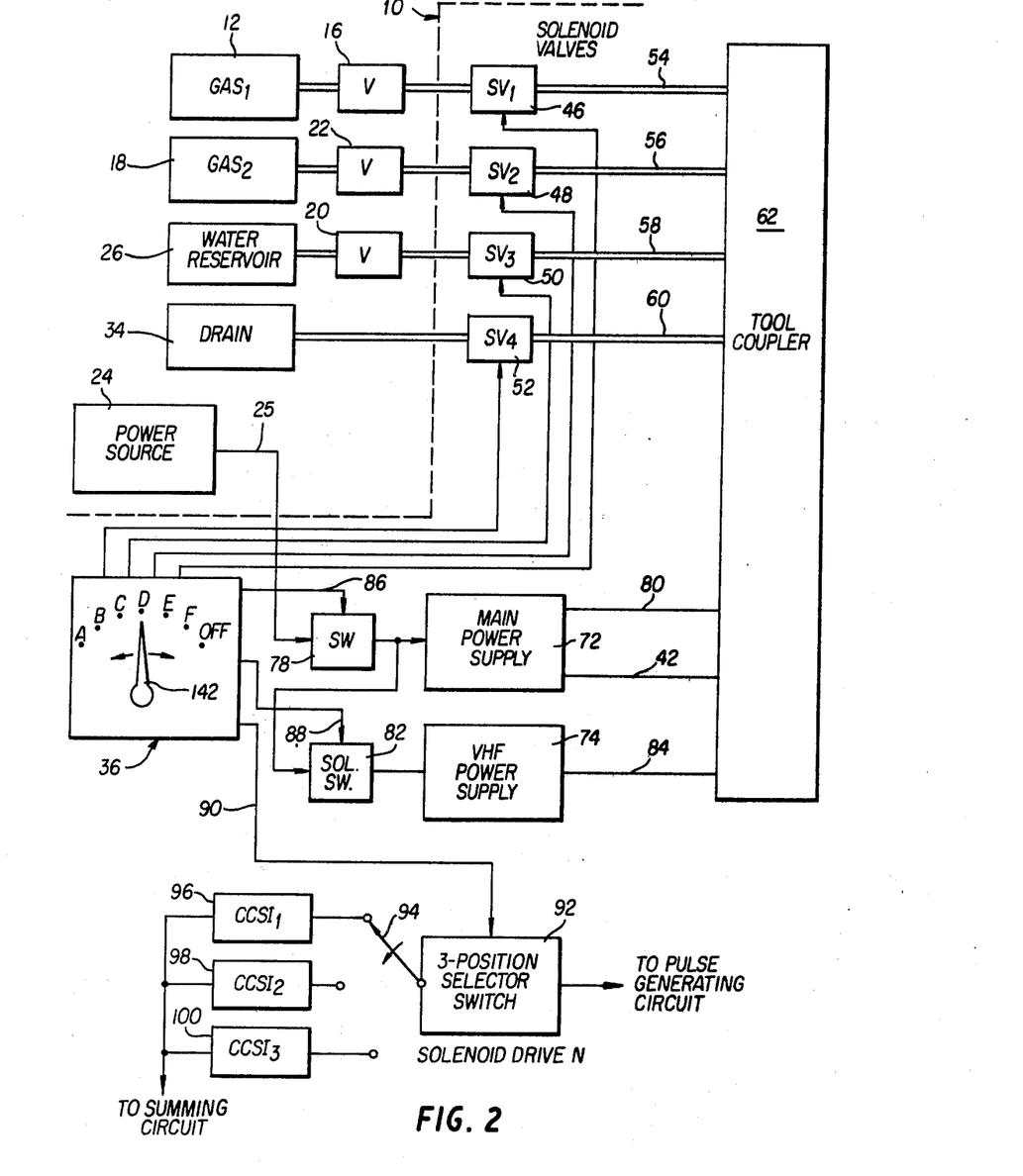
FIG. 2 is a block diagram of the control system for the combined selectively actuated fluid and power supply system employed in the present invention.

Reference is now directed to FIG. 2 which illustrates the internal fluid and power control network of the present invention. As shown in FIG. 2, the outputs of the gas cylinders 12 and 18, as well as the flow from the water reservoir 26 and to the drain 34 are controlled by conventional solenoid actuated valves 46, 48, 50 and 52. The valves are respectively connected via appropriate fluid lines 54, 56, 58 and 60 respectively to a conventional tool coupler 62 which includes the appropriate conventional gas, water and electrical connectors to permit the selected work head 38 and the multi-function line 44 to be coupled to the various fluid and power supplies within the housing 10.

The solenoid valves 46–52 are coupled to function selector switch 36 by appropriate control lines 64, 66, 68 and 70 respectively.

Also connected to the tool couplder 62 are a main power supply 72 and a very high voltage (VHV) power supply 74. The main power supply receives its input from power source 24 via line 25 passing through a solenoid actuated main power switch 78. It is understood that the power source 24 is a three-phase power source, and accordingly that the line 25 is a three-phase power line. The line 25 is connected through main power switch 78 to both the main power supply 72 and the VHV power supply 74. The main power supply is coupled through a line 80 to the tool coupler 62 while the VHV power supply 74 is coupled through a solenoid actuated switch 82 and a line 84 to the tool coupler 62. A control line 86 couples the solenoid actuated switch 78 with selector switch 36 while a similar control line 88 couples the selector switch to the solenoid actuated switch 82.

An additional control line 90 couples the selector switch 36 to a solenoid driven three position selector switch 92. The three position switch 92 is used to drive a contact 94 selectively among one of three curve characteristic setting impedances 96, 98 and 100 (CCSI$_1$, CCSI$_2$ and CCSI$_3$).

Figure 3:
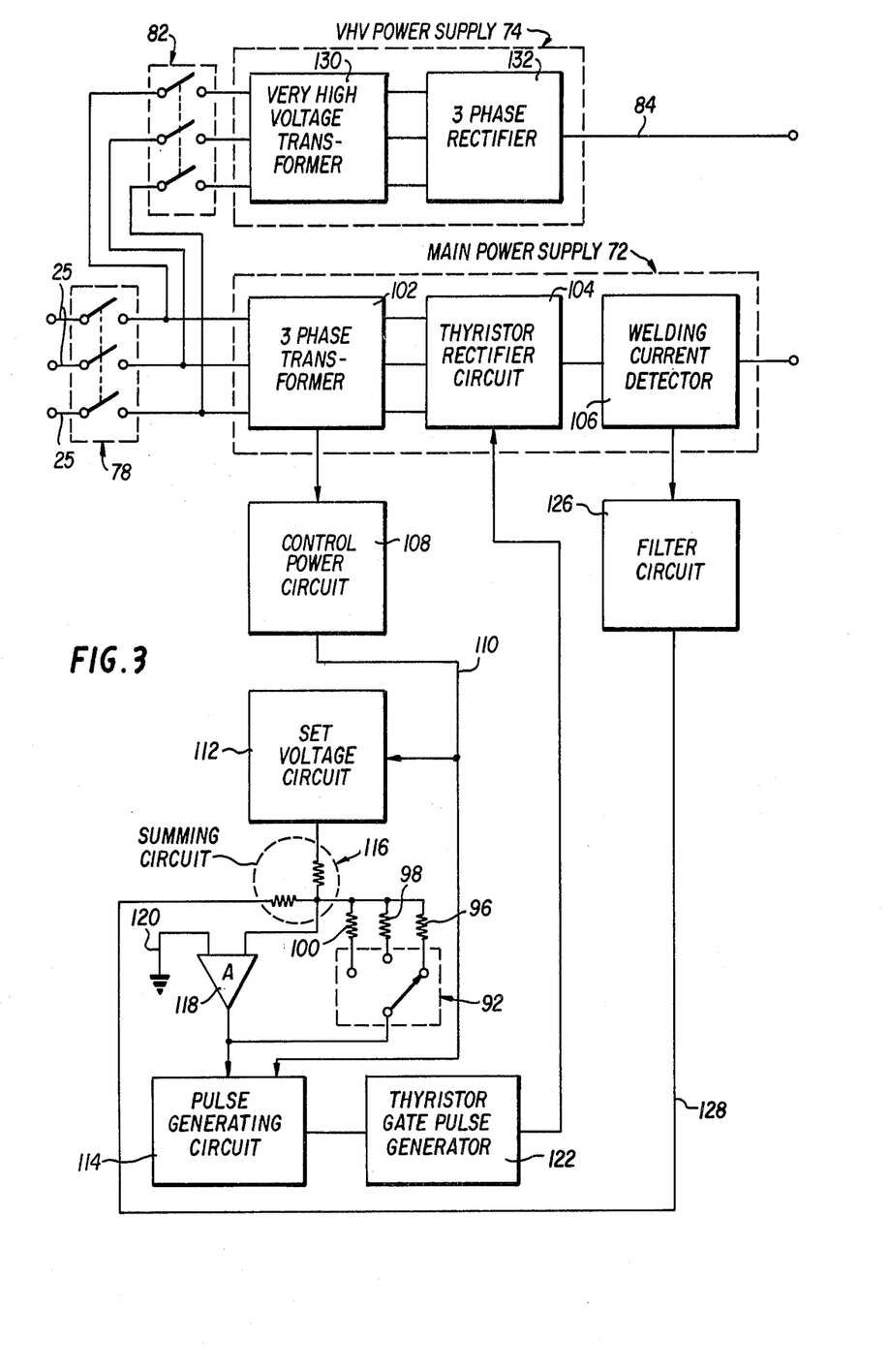
FIG. 3 is a schematic and block diagram of the electrical power supply and feedback circuit of the present invention.

Attention is now directed to FIG. 3 wherein the electrical power supply circuitry of the present invention is illustrated in greater detail. As shown in FIG. 3, the main power supply 72 includes a three-phase transformer 102 with a conventional thyristor rectifier circuit 104 coupled to the output thereof. A conventional welding current detector 106 is coupled between the output of the thyristor rectifier 104 and line 80 leading to tool coupler 62. A control power circuit, such as a conventional rectifier, is coupled to the output of the three-phase transformer for supplying power to the electronic control circuit of the main welding power supply. The control power circuit 108 is coupled via line 110 to a set voltage circuit 112 and to a pulse generating circuit 114. The set voltage circuit provides a reference potential which is supplied through a summing circuit 116 to a conventional comparator 118 having one input thereof coupled to a reference potential as indicated at 120. The previously mentioned curve characteristic setting impedances are illustrated in FIG. 3 as resistors which are coupled across the comparator 118 and in series with the solenoid driven three positions selector switch 92. The output of comparator 118 is coupled to pulse generating circuit 114 which is in turn coupled to a conventional thyristor gate pulse generator 122, the output of which is applied via a line 124 to the thyristor rectifier 104 to set the triggering level of the thyristors therein in the conventional manner. A filter circuit 126 is coupled to the welding current detector 106 and supplies an output signal therefrom via a line 128 to the summing circuit 116 to be added to the constant voltage output of the set voltage circuit 112 at the input of the comparator 118.

The operation of the main welding power supply 72 is such that the welding current output is monitored by the welding current detector and a signal presenting the welding current is fed back by a line 128 to the comparator 118 to be compared with a preset voltage level delievered by set voltage circuit 112. As the feedback signal on line 28 fluctuates, the resultant error signal is amplified to adjust the thyristor gate pulse generator 122 whereby the firing interval of the thyristors within the rectifier circuit 104 is adjusted to maintain the welding current at a constant level. The power supply circuit thus described is sufficient for providing power to carry out conventional arc welding operations. However, the main power supply circuit is not sufficient to carry out Plasma Cutting. For this purpose an additional very high voltage supply is necessary.

Accordingly the VHV supply 74 is coupled in parallel with the main power supply 72, and includes a very high voltage transformer 130, the output of which is supplied to a three-phase rectifier 132 and then to output line 84. The VHV transformer may be typically wound on the same core as the main power transformer 102, but has an entirely different purpose. The VHV transformer generates a voltage of 200 volts or more. This high open circuit voltage of 200 volts is necessary to carry on Plasma Cutting, as is well known to those skilled in the art.

A typical Plasma Cutting torch is illustrated in FIG. 7 in cutaway form. The torch includes a central tungsten electrode 134 having spaced therefrom a pilot electrode 136 of generally conical shape. A nozzle 138 of a highly insulating material, such as ceramic, surrounds the entire electrode structure, while the passage between the nozzle and the electrodes provide for flow of the pressurized gas used in the Plasma Cutting process. In operation, an arc must be struck between the pilot electrode 136 and the central tungsten electrode 134 to initiate the Plasma Cutting operation. This pilot arc illustrated at 140 ionizes the gas stream passing through the nozzle which in turn acts as a conductor to couple the main welding current supply to the work piece 40 when the nozzle is brought into proximity to the work piece. However, in view of the gap between the pilot electrode 136 and the tungsten electrode 134, a substantial open circuit voltage on the order of 200 volts is needed to strike the pilot arc, and thus the VHV transformer 130 is required. In operation, the output of the VHV transformer is coupled across the tungsten electrode 134 and pilot electrode 136.

Figure 6:
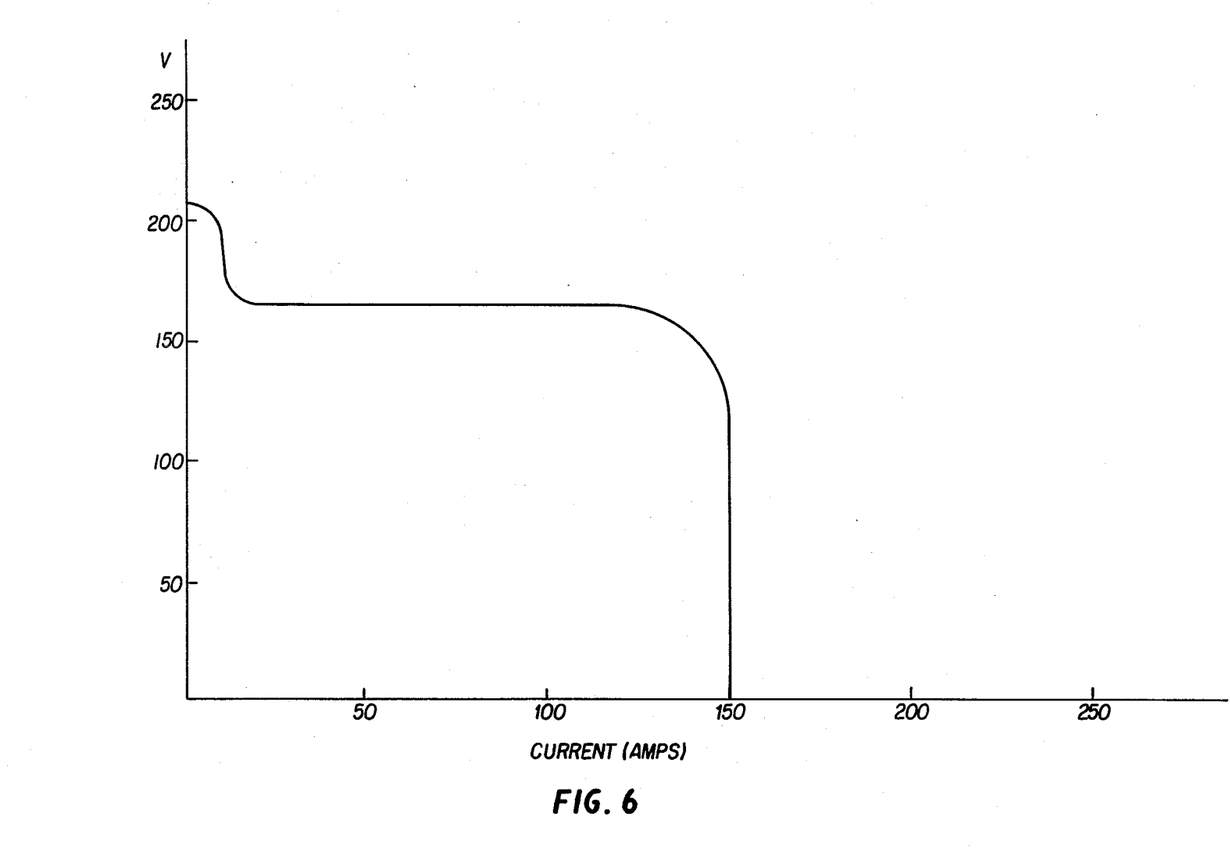
FIG. 6 is a graphical illustration of the voltage-current characteristic of the system of the present invention in the Plasma Cutting mode.

FIG. 6 illustrates in graphical form the current/voltage characteristic of the Plasma Cutting operation. As shown, an initial voltage on the order of 200 volts (open circuit) is first applied across the pilot gap to generate the pilot arc 140. When this arc is generated the open circuit voltage drops from approximately 200 volts to approximately 150 volts with only a slight current flow through the cutting nozzle. However, after the pilot arc is established current flow rapidly rises to approximately 150 amps and then, once a cutting plasma is established between the nozzle and the work piece, current output rapidly increases to the maximum amperage of the equipment whereby cutting takes place at an efficient and rapid rate.

In addition to providing for the pilot arc, the very high voltage transformer prevents extinguishing of the arc, as might occur under changing work distance conditions, irregularity in the surface of the work piece and other factors. The three-phase rectifier 132 coupled to the output of the VHV transformer provides a very smooth or low ripple voltage output. This provides for smooth cutting and prevents flickering or pulsing of the pilot arc during or between cutting operations. It further ensures that the cut is smooth and not sawtoothed, an important characteristic where expensive material is being cut.

The system of the present invention is unique in that it has the capability of delivering the appropriate power and voltage levels and also providing the correct fluid supplies to cutting heads for both two gas plasma and single gas argon cutting, both heavy and light duty as well as TIG welding with both water and air cooled torches and conventional stick welding. Thus, the apparatus of the present invention provides, in a single package, the functional capabilities that could be obtained in the past only with two totally separate and cumulatively very expensive units.

In accordance with the present invention, a conventional manually operable function selector switch 32 is provided, which includes a manually operable selector dial 142, capable of being adjusted among six contact positions labeled A-F and an OFF position. The conventional function selector switch is simply a ganged contact switch which makes contact among different groups of hard wired contact points, depending upon its rotational position. The function of the contact positions is set forth in Table 1 below.

TABLE 1

| Contacts | |
|---|---|
| A | Solenoid valve 46 open, solenoid valve 48 open, solenoid valves 50 and 52 closed, switch 82 closed, contact 94 engaging impedance 96 |
| B | Solenoid valve 46 open, solenoid valve 48 closed, solenoid valve 50 closed, solenoid valve 52 closed, switch 82 on, and contact 94 engaging impedance 96 |
| C | Solenoid valve 46 open, solenoid valve 48 open, solenoid valve 50 open, solenoid valve 52 open, switch 82 open, contact 94 engaging impedance 96 |
| D | Solenoid valve 46 closed, solenoid valve 48 open, solenoid valve 50 closed, solenoid valve 52 closed, switch 82 off, contact 94 engaging impedance 98 |
| E | Solenoid valve 46 closed, solenoid valve 48 closed, solenoid valve 50 open, solenoid valve 52 open, switch 82 closed, contact 94 engaging impedance 98 |
| F | Solenoid valve 46 closed, solenoid valve 48 closed, solenoid valve 50 closed, solenoid valve 52 closed, switch 82 off, contact 94 engaging impedance 100 |

The purpose of these various selections is to permit the correct combination of fluids and appropriate energy levels to be delivered to the cutting head coupled to the tool coupler 62. Specifically, when dial selector 142 is set to contact A, the plasma cutting operation is selected with an air cooled torch. In this case the two gas solenoid valves 46 and 48 are opened, and it is presumed that the manually operated valves 12 and 22 are maintained in an open position. However, the water cooling valves 50 and 52 are closed, as no cooling water is required. The switch 82 is closed to permit the VHV power supply to deliver the required very high voltage to carry out the plasma cutting operation. Finally, the proper impedance 96 is selected to maintain the high voltage level for the plasma cutting operation. When contact B is selected a light duty single gas argon cutting operation is selected. In this case a single gas is used from the cylinder 12 and the water cooling and draining solenoid valves are activated, as there is a need for cooling water. Switch 82 is closed to supply the high voltage required for single gas argon cutting, and the same impedance is used as for two gas plasma cutting.

Figure 4:
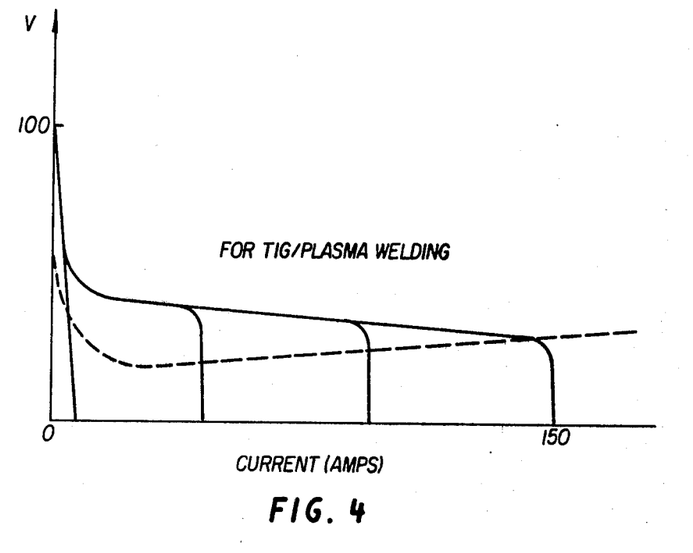
FIG. 4 is a graphical illustration of a typical TIG/Plasma Welding voltage-current characteristic.
Figure 5:
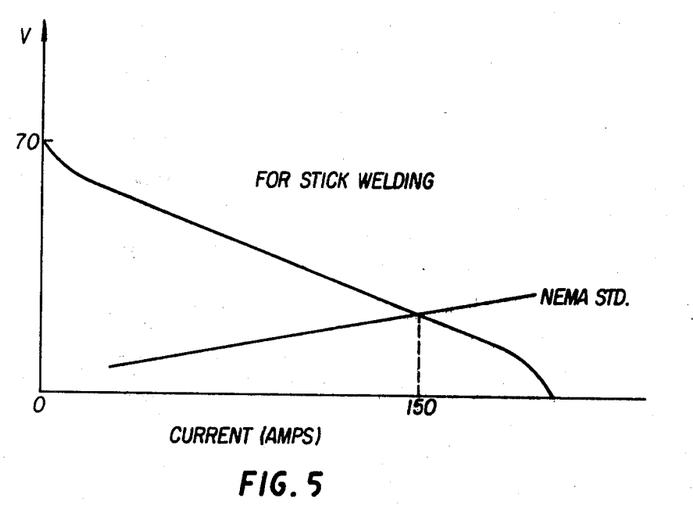
FIG. 5 is a graphical illustration of a conventional Stick Welding voltage-current characteristic.

When the selector is turned to contact C, heavy duty, two gas plasma cutting is selected. In this case a water cooled torch is utilized as are two separate gases. Thus, the solenoid valves 46–52 are all opened, and the switch 82 is closed to provide high potential. The impedance 96 remains engaged. At contact D, tungsten-inert-gas welding is selected with an air cooled torch. In this case one gas is supplied through solenoid valve 46, while the remaining solenoid valves are closed. Switch 82 is open as the high voltage is no longer required, and impedance 98 is selected, providing an appropriate voltage-current characteristic as shown in FIG. 4. When contact E is selected, tungsten-inert-gas welding with a water cooled torch is selected. In this case solenoid valve 46 is opened, as are the water cooling and draining solenoid valves 50 and 52, while switch 82 remains open and impedance 98 is again selected. Contact F is for ordinary stick welding. In this instance the solenoid valves 46–52 remain closed, switch 82 is open, and impedance 100 is selected, providing the more sloped voltage-current characteristic shown in FIG. 5. Finally, the selector dial 142 may be turned to the "Off" position, at which time the solenoid operated switch 78 is opened and the main power supply is entirely switched off to render the system fully inoperative and safe.

It will be understood by those skilled in the art that the appropriate types of cutting and welding tools must be coupled to the tool coupler 62 in accordance with the functions being performed. However, those skilled in the art are well aware of the appropriate types of tools that may be coupled to a system of this type, and the various tools are readily available from appropriate commercial sources, such as World Wide Welding, 3200 Cullman Ave., Charlotte, N.C. 28225.

As a variation of the system thus described, a plurality of tool couplers 62 may be incorporated into the system. In this instance, a welding torch and a cutting torch may simultaneously be connected to the individual tool couplers. However, only one of these tools would be operative at any given instant, depending upon the position at which the selector dial 142 is set. Nevertheless, the convenience of having two tools coupled to the system at any one time and the ability to simply twist the selector dial 142 to engage a totally different welding or cutting function is a great advantage in a fabrication shop where numerous operations must be carried out in sequence.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power and fluid supply system for a multiple function welding and cutting apparatus, comprising:
   tool coupling means for coupling a selected working head to said system;
   fluid supply means connected to said tool coupling means for selectively delivering appropriate fluids to said tool coupling means;
   power supply means connected to said tool coupling means for selectively supplying appropriate voltage and current levels to said tool coupling means;
   selector switch means coupled to said fluid supply means and to said power supply means for selectively changing the outputs thereof;
   main power transformer for supplying a main welding current;
   very high voltage transformer means for supplying very high voltages required in plasma cutting;
   transformer switching means coupled between said main transformer means and said very high voltage transformer means for selectively connecting said main transformer means and said very high voltage transformer means in parallel;
   thyristor rectifier means coupled to said main power transformer means for rectifying the output thereof;
   a plurality of curve characteristics setting impedance means coupled to said thyristor rectifier means for adjusting the operating characteristics thereof; and
   solenoid driven impedance selector switch means coupled to said plurality of curve characteristics setting impedance means for selectively utilizing one of said curve characteristics setting impedance means.

2. A power and fluid supply system as in claim 1, wherein said fluid supply means further comprises:
   a first solenoid operated valve means adapted to be coupled to a plurality of gas reservoirs for controlling gas flow from said gas reservoir; and
   a second solenoid operated valve means adapted to be coupled to a cooling liquid source for controlling liquid flow from said source.

3. A power and fluid supply system as in claim 1, wherein:
   said selector switch means is coupled to said first and second solenoid operated valve means, said transformer switching means and to said solenoid driven impedance selector switch means for selectively actuating them.

4. A power and fluid supply system as in claim 3, wherein said first solenoid operated valve means comprises:
   a plurality of solenoid operated valves, each valve adapted to be coupled to a separate gas reservoir for controlling the gas flow from each reservoir to said tool coupling means.

5. A power and fluid supply system as in claim 4, wherein said power supply means further comprises:
   welding current detector means coupled to said thyristor rectifier means for monitoring the output thereof; and
   feedback circuit means coupled to said welding current detector means for controlling the output of said thyristor rectifier means in response to the output of said welding current detector means.

6. A variable power and fluid supply system for a multiple welding and cutting apparatus, comprising:
   tool coupling means for connecting a selected working head to said system;
   first solenoid operated valve means adapted to be coupled to a plurality of gas reservoirs for controlling gas flow from said gas reservoir, said first solenoid operated valve means including a plurality of solenoid operated valves, each valve adapted to be coupled to a separate gas reservoir for controlling the gas flow from each reservoir to said tool comprising means;
   a second solenoid operated valve means adapted to be coupled to a cooling liquid source for controlling liquid flow from said source;
   main power transformer means for supplying a main welding current, very high voltage transformer means for supplying very high voltages required in plasma cutting;

transformer switching means coupled between said main transformer means and said very high voltage transformer means for selectively connecting said main transformer means and said very high voltage transformer means in parallel;

thyristor rectifier means coupled to said main power transformer means for rectifying the output power thereof;

a plurality of curve characteristic setting impedance means coupled to said thyristor rectifier means for adjusting the operating characteristics thereof;

solenoid driven selector switch means coupled to said plurality of curve characteristic setting impedance means for selectively utilizing one of said curve characteristic setting impedance means;

welding current detector means coupled to said thyristor rectifer means for monitoring the output thereof;

feedback circuit means coupled to said welding current detector means for controlling the output of said thyristor rectifier means in response to the output of said welding current detector means; and manually operable selector switch means coupled to said first and second solenoid operated valve means, said transformer switching means and to said solenoid driven selector switch means for selectively actuating them in response to manual operation of said selector switch means.

* * * * *